July 14, 1970  D. ENGELSMANN ET AL  3,520,237

ROTARY SOCKET FOR MULTIPLE FLASHBULB HOLDERS

Filed Jan. 13, 1967

INVENTOR.
DIETER ENGELSMANN
FRANZ LANDBRECHT
SIEGFRIED ZOBEL

BY

United States Patent Office 3,520,237
Patented July 14, 1970

3,520,237
ROTARY SOCKET FOR MULTIPLE FLASHBULB HOLDERS
Dieter Engelsmann and Franz Landbrecht, Unterhaching, Munich, and Siegfried Zobel, Munich, Germany, assignors to Agfa-Gevaert Aktiengesellschaft, Leverkusen, Germany
Filed Jan. 13, 1967, Ser. No. 609,128
Claims priority, application Germany, Jan. 14, 1966, A 51,317
Int. Cl. G03b 19/00
U.S. Cl. 95—11                                    10 Claims

ABSTRACT OF THE DISCLOSURE

A camera having a stationary bearing element, a rotary socket for receiving a multiple flashbulb holder mounted in the bearing, and a motion transmitting member for adjusting the shutter speed of the camera. The motion transmitting member is mounted substantially within the coupling portion of the rotary socket and is biased in a vertical direction by a spring contained within the rotary socket. The motion transmitting member is moved downwardly against the bias of the spring in response to insertion of a flashbulb holder into the socket to adjust the shutter speed for a flash exposure. The spring biased parts of the socket are arranged in such a way that the friction between the rotary socket and the bearing element is not affected by the insertion of a flashbulb holder into the socket.

---

The present invention relates to flash units in general, and more particularly to improvements in sockets for multiple flashbulb holders which can be utilized in flash units.

It is already known to provide a flash unit with a socket whose female coupling member can be connected with the plug of a conventional multiple flashbulb holder and is indexible to place successive or selected flashbulbs of a properly attached holder into an optimum position with reference to the subject. For example, the female coupling member of a flash unit which is built into a photographic camera can be indexed between four positions and can be attached with a so-called "Flashcube" having four equidistant flashbulbs each of which is located in front of a suitable reflector. The retaining means for yieldably holding the plug of the multiple flashbulb holder in the female coupling member of the socket normally comprises one or more springs which engage teeth provided on the plug and prevent unintentional separation of the holder. It is also customary to provide an operative connection between the shutter and the multiple flashbulb holder so that the shutter is automatically set to furnish a predetermined exposure time when the holder is properly attached to the flash unit. Such operative connection normally comprises a spring which resets the shutter in response to separation of a multiple flashbulb holder from the flash unit. The spring operates between the housing of the flash unit or camera and the rotary part of the flash unit and thus contributes to friction between the rotary parts and their bearings. The spring or springs of the retaining means also tend to increase friction between the rotary parts and their bearings so that the wear on such rotary parts is rather high and the indexing mechanism must transmit a consderable force in order to overcome the bias of all such springs which tend to tilt or to otherwise displace the rotary parts relative to their bearings.

Proposals to reduce friction include the utilization of antifriction bearings for the rotary parts of the flash unit. Such bearings contribute to the initial cost of the flash unit (or of the camera if the flash unit is built directly into the housing of a camera), not only because they are expensive but also because it takes much time to properly install the bearings in the stationary part of the flash unit.

Accordingly, it is an important object of the present invention to provide a socket for use in flash units in or on photographic cameras and to construct and assemble the socket in such a way that the provision of various springs need not contribute to friction and/or misalignment of rotary socket parts with reference to stationary parts.

Another object of the invention is to provide a socket whose rotary parts can be coupled with a multiple flashbulb holder in such a way that the retaining means for the holder cannot increase friction between such rotary parts and their stationary support.

A further object of the invention is to provide a socket of the just outlined characteristics which is provided with spring-biased motion transmitting means to select or change an exposure value in response to attachment or detachment of a multiple flashbulb holder and wherein such motion transmitting means need not contribute to greater friction between the rotary parts and stationary part or parts of the socket.

An additional object of the invention is to provide a detent structure for the rotary parts of a socket for multiple flashbulb holders and to construct such detent structure in such a way that its action upon the rotary parts cannot increase friction or cause misalignment of rotary parts with reference to the stationary part or parts of the socket.

A concomitant object of the invention is to provide a simple, compact and inexpensive socket which can be used with equal advantage in self-sustained flash units as well as in flash units which are built into photographic cameras.

Still another object of the invention is to provide a novel rotary female coupling member which can be utilized in the above outlined socket and which is not subjected to additional axial and/or radial stresses in response to attachment of a multiple flashbulb holder so that friction between such female coupling member and its bearing need not increase when the coupling member is connected to and indexed with a multiple flashbulb holder.

SUMMARY OF THE INVENTION

The invention resides in the provision of a socket for use in flash units to support and rotate multiple flashbulb holders, particularly to support and rotate so-called "Flashcubes" of the type having a plug and four equidistant flashbulbs each located in front of a reflector. The socket comprises stationary bearing means, indexible female coupling means rotatably mounted in the bearing means, and one or more yieldable retaining, detent and/or motion transmitting means arranged to produce forces which act solely upon the holder and/or coupling means in such a way that friction between the coupling means and the bearing means does not increase in response to attachment or detachment of a multiple flashbulb holder, in response to retention of the coupling means in one of a series of predetermined angular positions in each of which a flashbulb faces the subject, and/or in response to transmission of motion to the shutter or to another part of the exposure control on insertion or removal of a multiple flashbulb holder.

In accordance with a presently preferred embodiment of the invention, the coupling means carries two resilient means one of which opposes the insertion of a multiple flashbulb holder and the other of which opposes separation of the holder from the coupling means. Both such resilient means are mounted on the coupling means and operate solely between spaced stop portions of the coupling means or between the coupling means and the holder so that friction between the coupling means and the bearing means need not increase in response to insertion or separation of the holder. The one resilient means which opposes insertion of a holder can also serve to change the position of motion transmitting means for adjusting the shutter in response to insertion or detachment of the holder.

The novel features which are considered as characteristic of the invention are set forth in particular in the appnded claims. The improved socket itself, however, both as to its construction and the mode of mounting the same, together with additional features and advantages thereof, will be best understood upon perusal of the following detailed description of certain specific embodiments with reference to the accompanying drawing.

DESCRIPTION OF THE PREFERRED EMBODIMENTS

Figure 1:
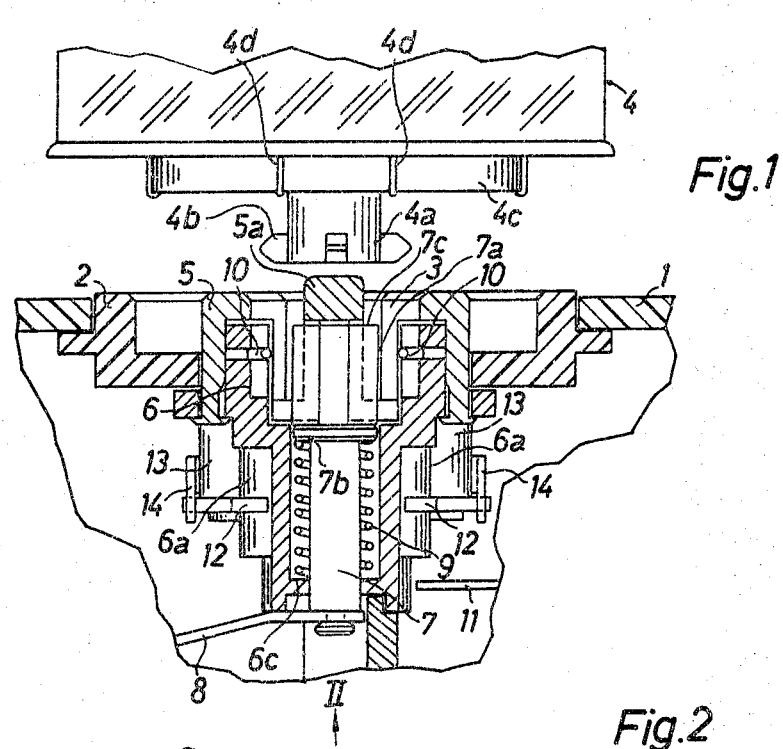
FIG. 1 is an enlarged axial section through a socket which is installed in a photographic camera, further showing a portion of a multiple flashbulb holder.

The drawing illustrates a portion of a still camera having a housing which includes a top wall 1 provided with an opening for a bearing ring 2. The latter constitutes the stationary part of the socket and carries a rotary female coupling member 3 which can be coupled with a conventional multiple flashbulb holder 4, a so-called "Flashcube" having four flashbulbs each of which is located in front of a suitable reflector. The holder 4 further comprises a ring-shaped base 4c of insulating material for four pairs of electrical terminals 4d, one pair for each flashbulb. The base 4c surrounds a centrally located tubular male coupling member or plug 4a provided with four radially outwardly extending teeth 4b bounded by pairs of mutually inclined front and rear faces in a manner well known from conventional multiple flashbulb holders.

The female coupling member 3 comprises a cylindrical outer portion or sleeve 5 which is rotatable in the bearing ring 2 and a cylindrical inner portion or sleeve 6 which is received in and is fixedly connected to the outer sleeve 5. The inner sleeve 6 is provided with two axially spaced groups of outwardly extending projections or lugs 6a and 6b. The projections 6a are equidistant from each other and are adjacent to the inner axial end of the outer sleeve 5. The projections 6b are also equidistant from each other and are provided at the innermost end of the inner sleeve 6. This inner sleeve is further provided with an internal stop collar 6c whose annular upper end face constitutes an abutment for one end convolution of a resilient element here shown as a helical spring 9. The collar 6c guides an axially reciprocable motion transmitting bolt 7 whose inner end is rotatably coupled to a motion transmitting arm 8. The function of the arm 8 is to adjust the shutter (not shown) so that the shutter is automatically set for a predetermined exposure time when the bolt 7 is depressed against the opposition of the spring 9.

The upper end portion 7a of the bolt 7 is flattened at two diametrically opposite sides to form a two-faced head which cannot rotate with reference to the inner sleeve 6. The head 7a has a shoulder 7b at its lower or inner end, and this shoulder serves as an abutment or stop for the adjoining end convolution of the spring 9. The outer sleeve 5 has a diametrically extending bridge 5a at its outer end and the outer end face 7c of the head 7a abuts against this bridge when the multiple flashbulb holder 4 is detached from the female coupling member 3. Thus, the spring 9 then bears against the collar 6c and indirectly against the bridge 5a, i.e., against two rigidly connected stop portions of the female coupling member 3.

The inner sleeve 6 supports at least two yieldable retaining members in the form of radially inwardly extending springs 10 which can engage the teeth 4b of the plug 4a when the holder 4 is attached to the female coupling member 3 to oppose withdrawal of the holder. FIG. 1 shows two retaining springs 10 which are disposed diametrically opposite each other, and each of these springs projects into a guide slot provided in the internal surface and extending in parallelism with the axis of the inner sleeve 6. If the operator decides to attach the holder 4 to the female coupling member 3, he introduces the plug 4a into the central opening of the outer sleeve 5 so that the teeth 4b slide in the respective grooves in the internal surface of the inner sleeve 6. The bridge 5a is small enough to enter the bore of the plug 4a but the latter bears against the outer end face 7c and pushes the head 7a inwardly so that the entire bolt 7 moves downwardly, as viewed in FIG. 1, and displaces the arm 8 to select the optimum exposure time by simultaneously compressing the spring 9. Once the retaining springs 10 snap behind the inclined rear faces of two teeth 4b, the holder 4 is properly attached to and can rotate with the female coupling member 3. It will be noted that, when the insertion of the plug 4a is completed the springs 9 and 10 do not increase friction between the female coupling member 3 and bearing ring 2 because the spring 9 bears against the stop collar 6c and stop shoulder 7b whereby the head 7a biases the teeth 4b against the respective springs 10. The springs 10 are anchored in the inner sleeve 6 and the collar 6c forms part of the inner sleeve so that the multiple flashbulb holder 4 is properly retained without causing increased friction between the female coupling member 3 and ring 2 and also without causing any tilting or other misalignment of the female coupling member. The spring 9 invariably bears against two portions of the female coupling member 3, namely against two portions of the inner sleeve 6, whereby one of its end convolutions bears directly against an integral part of the inner sleeve (namely, against the collar 6c) and its other end convolution bears against the inner sleeve indirectly, that is to say, through the intermediary of the bolt 7. When the plug 4a is withdrawn, the other end convolution of the spring 9 bears against the bridge 5a through the intermediary of the bolt 7. When the plug 4a is inserted, the other end convolution of the spring 9 bears against the inner sleeve 6 through the intermediary of the bolt 7, plug 4a, teeth 4b and retaining springs 10.

Figure 2:
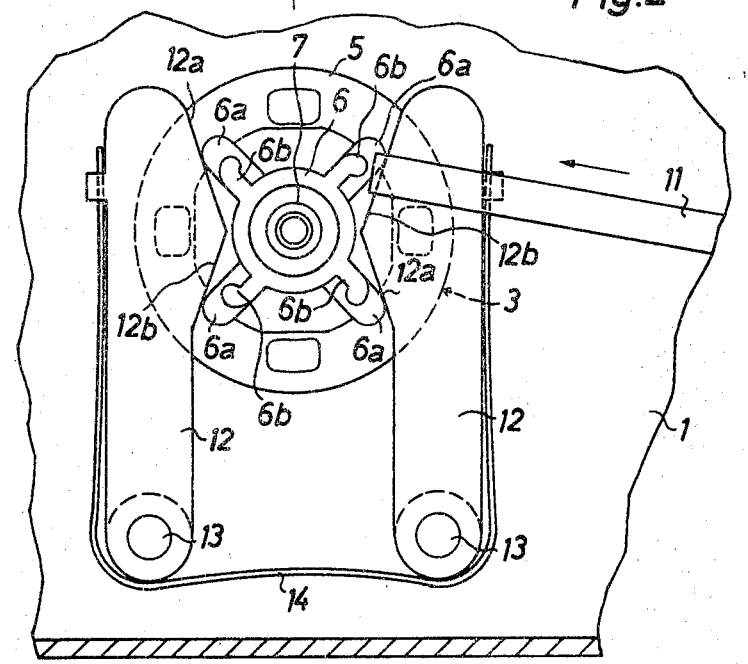
FIG. 2 is a bottom plan view as seen in the direction of the arrow II in FIG. 1.

The means for indexing the female coupling member 3 comprises a reciprocable pusher 11 which can form part of the film transporting mechanism (not shown) and can engage successive projections 6b in response to successive manipulations of the film transporting mechanism whereby the entire female coupling member 3 (and the multiple flashbulb holder 4) is caused to make a quarter turn in a counterclockwise direction, as viewed in FIG. 2. Of course, it is equally possible to provide the sleeve 5 or 6 with a wheel or an analogous manually operable member to replace the pusher 11 or to be used instead of the pusher when the operator so desires.

In order to make sure that the female coupling member 3 will be arrested in such angular positions in which one of the four flashbulbs in the holder 4 invariably assumes an optimum position with reference to the subject (in which the axis of the respective reflector is substantially parallel with the optical axis), the camera further comprises yieldable detent means which includes the aforementioned projections 6a and two mirror symmetrical levers 12 pivotable about parallel pivot pins 13 mounted at the underside of the top wall 1 or on another portion of the camera housing. The levers 12 are biased by a U-shaped leaf spring 14 which tends to move their free ends toward each other, i.e., toward the axis of the female coupling member 3 which is parallel with the pivot pins 13. The levers 12 are provided with pairs of mutually inclined cam faces 12a, 12b each of which is engaged by one of the projections 6a when the female coupling member 3 is brought to a halt subsequent to completion of an indexing step. When an indexing step begins (i.e., when the pusher 11 causes the female coupling member 3 to turn in a counterclockwise direction, as viewed in FIG. 2), two of the projections 6a bear against the adjoining cam faces 12a and move the free ends of the lever 12 apart. When such projections 6a move beyond the ridges between the adjoining cam faces 12a, 12b and begin to slide along the cam faces 12b, the bias of the U-shaped spring 14 contributes to further indexing of the female coupling member 3 by exerting upon the abutting projections 6a a torque which tends to turn the sleeves 5, 6 in a counterclockwise direction. The indexing step is completed when the other two projections 6a engage cam faces 12a. Since the levers 12 are mirror symmetrical with reference to the axis of the female coupling member 3, they do not tend to tilt or to otherwise misalign the sleeves 5, 6 with reference to the bearing ring 2. Also, such levers do not tend to shift the female coupling member 3 in the axial direction so that their action upon the female coupling member cannot contribute to greater friction between the female coupling member and the structure in which this coupling member rotates. When the female coupling member 3 assumes one of its four angular positions, each of the four cam faces 12a, 12b bears against one of the projections 6a whereby the levers 12 subject the sleeve 6 to the action of fully balanced forces which act radially inwardly at right angles to the axis of rotation of the female coupling member. This insures that the levers 12 do not contribute to greater friction between the outer sleeve 5 and bearing ring 2.

Of course, the improved socket is susceptible of many further modifications without departing from the spirit of the invention. For example, the female coupling member 3 can be mounted in a flash unit which is not built into the housing of a camera but is provided with a standard foot insertable into a complementary shoe of the camera. Moreover, the female coupling member 3 can be installed in an adapter which is connectable with a camera or with the casing of a flash unit. Furthermore, and as mentioned before, the pusher 11 of the film transporting mechanism constitutes but one of several suitable indexing means for the female coupling member 3. Such indexing means may include a customary spring motor or an electromagnet which latter is energized in response to firing of a flashbulb. Instead of having detent means with only two levers 12, the structure shown in FIGS. 1 and 2 can be provided with three or more symmetrically arranged levers. The spring 9 could be replaced by a spring which is compressible and expansible radially of the axis, as long as such spring bears against two portions of the female coupling member to prevent any increase in friction between the female coupling member and its bearings. The female coupling member 3 can be made of a single piece of metallic or synthetic plastic material Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims.

What is claimed is:

1. A socket for use in flash units to support and rotate multiple flashbulb holders, comprising stationary bearing means; rotary female coupling means indexible in said bearing means and adapted to receive a part of a multiple flashbulb holder in such a way that the holder is indexible with said female coupling means relative to said bearing means; motion transmitting means including a motion transmitting member indexible with said female coupling means and movable relative to and substantially within said female coupling means between first and second positions in response to insertion of said part of a multiple flashbulb holder into said female coupling means, and resilient means supported exclusively by said female coupling means, said resilient means engaging said motion transmitting member in the interior of said female coupling means and reacting against said female coupling means in each position of said motion transmitting member so as to avoid an increase in friction between said female coupling means and said bearing means; and means for indexing said female coupling means.

2. A socket as defined in claim 1, further comprising detent means for yieldably holding said female coupling means in selected angular positions.

3. A socket as defined in claim 1, wherein said bearing means comprises a ring fixed to the housing of a photographic camera and said female coupling means comprises sleeve means rotatable in said ring.

4. A socket as defined in claim 1 wherein said coupling means comprises yieldable retaining means provided on said coupling means to exert a retaining force upon said part of a multiple flashbulb holder when such part is inserted into said coupling means whereby such retaining force acts exclusively between the holder and said coupling means and does not contribute to friction between said bearing means and said coupling means.

5. A socket for use in flash units to support and rotate multiple flashbulb holders, comprising stationary bearing means; rotary female coupling means indexible in said bearing means and adapted to receive a part of a multiple flashbulb holder in such a way that the holder is indexible with said coupling means relative to said bearing means; motion transmitting means including a motion transmitting member indexible with and movable relative to said coupling means between first and second positions in response to insertion of said part of a holder into said coupling means, and resilient means supported exclusively by said coupling means, said resilient means engaging said motion transmitting member and reacting against said coupling means in each position of said motion transmitting member so as to avoid an increase in friction between said coupling means and said bearing means; means for indexing said coupling means; and detent means for yieldably holding said coupling means in selected angular positions with reference to said bearing means, said detent means being arranged to subject said coupling means to the action of forces acting solely radially inwardly at right angles to the axis of rotation of said coupling means to avoid increased friction between said coupling means and said bearing means when said coupling means assumes one of said angular positions.

6. A socket for use in flash units to support and rotate multiple flashbulb holders, comprising stationary bearing means; rotary female coupling means indexible in said bearing means and adapted to receive a part of a multiple flashbulb holder in such a way that the holder is indexible with said coupling means relative to said bearing means; motion transmitting means including a motion transmitting member indexible with and movable relative to said female coupling means between first and second positions in response to insertion of said part of a holder into said coupling means, and resilient means supported exclusively by said coupling means, said resilient means engaging said motion transmitting member and reacting against said coupling means in each position of said motion transmitting member so as to avoid an increase in friction between said coupling means and said bearing means; means for indexing said coupling means; and detent means for yieldably holding said coupling means in selected angular positions, comprising spring-biased elements arranged to oppose rotation of said coupling means from said angular positions and to subject said coupling means to the action of forces acting in directions radially toward and at right angles to the axis of said coupling means.

7. A socket as defined in claim 6, wherein said elements are levers each of which is pivotable about an axis parallel to the axis of said coupling means and having cam faces engaging with equidistant projections provided on said coupling means to normally hold said coupling means in one of said angular positions, said levers being mirror symmetrical with reference to the axis of said coupling means.

8. A socket for use in flash units to support and rotate multiple flashbulb holders, comprising stationary bearing means; rotary female coupling means indexible in said bearing means and adapted to receive a part of a multiple flashbulb holder in such a way that the holder is indexible with said coupling means relative to said bearing means, said coupling means including a pair of axially spaced stops; motion transmitting means including a motion transmitting member indexible with and movable relative to said coupling means between first and second positions in response to insertion of said part of a holder into said coupling means, and resilient means supported exclusively by said coupling means, said resilient means engaging said motion transmitting member and reacting against one of said stops in each position of said motion transmitting member so as to avoid an increase in friction between said coupling means and said bearing means, said resilient means being arranged to bias said motion transmitting member against the other stop when said part of the holder is withdrawn from said coupling means and to oppose insertion of said part of a holder into said coupling means and to bias such part against a third portion of said coupling means upon completed insertion of said part into said coupling means; and means for indexing said coupling means.

9. A socket as defined in claim 8, wherein said motion transmitting member is reciprocably received in said coupling means and biased by said resilient means against said other stop when said part of a holder is withdrawn from said coupling means, said motion transmitting member being moved away from said one stop in response to insertion of said part of a holder into said coupling means whereby said motion transmitting member urges such part against the third portion of said coupling means.

10. A socket as defined in claim 9, wherein said motion transmitting means further comprises a second motion transmitting member connected with said first-mentioned motion transmitting member and arranged to select a predetermined exposure value in response to insertion of said part of a multiple flashbulb holder into said coupling means.

References Cited
UNITED STATES PATENTS

| | | | |
|---|---|---|---|
| 3,353,467 | 11/1967 | Ernisse et al. | 95—11.5 |
| 3,357,329 | 12/1967 | Nerwin | 95—11 |
| 3,369,468 | 2/1968 | Sapp et al. | 95—11.5 |

JOHN M. HORAN, Primary Examiner

F. L. BRAUN, Assistant Examiner